US011870177B1

(12) United States Patent
Ruan

(10) Patent No.: US 11,870,177 B1
(45) Date of Patent: Jan. 9, 2024

(54) PROTECTIVE COVER PLATE FOR FLAT PLUG AND FLAT PLUG WITH SAME

(71) Applicant: Xiqing Ruan, Zhejiang (CN)

(72) Inventor: Xiqing Ruan, Zhejiang (CN)

( * ) Notice: Subject to any disclaimer, the term of this patent is extended or adjusted under 35 U.S.C. 154(b) by 0 days.

(21) Appl. No.: 18/328,284

(22) Filed: Jun. 2, 2023

(30) Foreign Application Priority Data

May 18, 2023 (CN) ........................ 202310574889.3

(51) Int. Cl.
*H01R 13/447* (2006.01)
*H01R 24/30* (2011.01)
*H01R 103/00* (2006.01)

(52) U.S. Cl.
CPC .......... *H01R 13/447* (2013.01); *H01R 24/30* (2013.01); *H01R 2103/00* (2013.01)

(58) Field of Classification Search
CPC .............. H01R 13/6395; H01R 13/447; H01R 13/6392; H01R 25/00; H01R 25/003; H01R 24/30; H01R 2103/00
USPC .......................................... 439/373; 174/67
See application file for complete search history.

(56) References Cited

U.S. PATENT DOCUMENTS

| | | | | | |
|---|---|---|---|---|---|
| 4,457,571 | A * | 7/1984 | Lavine | H01R 13/6395 | 439/369 |
| 4,851,612 | A * | 7/1989 | Peckham | H01R 13/6395 | 174/67 |
| 5,655,924 | A * | 8/1997 | Cross | H01R 13/6395 | 439/373 |
| 5,934,919 | A * | 8/1999 | Cross | H01R 13/6395 | 439/373 |
| 7,104,830 | B1 * | 9/2006 | Diaz | H01R 13/6395 | 439/372 |
| 9,017,104 | B2 | 4/2015 | Powley | | |
| 9,509,080 | B1 | 11/2016 | Insalaco | | |
| 11,450,997 | B1 | 9/2022 | Insalaco | | |
| 2007/0032109 | A1 | 2/2007 | Hung | | |
| 2010/0285681 | A1 * | 11/2010 | Saruwatari | H01R 13/6395 | 439/345 |
| 2014/0322959 | A1 * | 10/2014 | Garofalo | H01R 13/6397 | 439/373 |

* cited by examiner

*Primary Examiner* — Gary F Paumen

(57) ABSTRACT

The present invention discloses a protective cover plate for a flat plug and the flat plug with the same. A limit slot is arranged on a cover plate body of the protective cover plate and is configured to be sheathed outside the flat plug and to limit the flat plug, so that the flat plug is located in a protective space of the cover plate body. The flat plug can be inserted into or pulled from a plugboard by operating the protective cover plate. The flat plug is used in cooperation with the protective cover plate, and a positioning insert matched with the limit slot is arranged on the flat plug, thereby improving the safety of use.

7 Claims, 8 Drawing Sheets

PROTECTIVE COVER PLATE FOR FLAT PLUG AND FLAT PLUG WITH SAME

TECHNICAL FIELD

The present invention relates to the technical field of connectors, in particular to a protective cover plate for a flat plug and the flat plug with the same.

BACKGROUND

Most power plugs are straight plugs with a thickness of approximately 5 cm. When a plug is inserted into a wall socket, furniture cannot be attached to the surface of a wall during arrangement, and a storage space for the plug is required. Therefore, due to the thickness limitation of the plug, a distance of 5 cm is often required between the furniture and the wall, resulting in space waste.

To solve the above problem of space waste, people have developed a flat plug with a thickness of less than 8 mm. In this case, the furniture only needs to be arranged 8 mm away from the wall, thus effectively saving space. However, the flat plug is too thin, and a hand is close to the wall socket during insertion and pulling of the plug, so that people always worry about the risk of electric shock and there are potential safety hazards.

Therefore, how to reduce the risk of electric shock and improve the safety during use of the flat plug has become an urgent problem to be solved.

SUMMARY

In view of this, the present invention provides a protective cover plate for a flat plug and the flat plug with the same, to solve the problem of potential safety hazards caused by a hand being close to a wall socket during insertion and pulling of a conventional flat plug.

On the one hand, the present invention provides a protective cover plate for a flat plug, the protective cover plate including: a cover plate body, where convex edges extending upwards are arranged around the cover plate body, so that a protective space is formed on a surface of the cover plate body;

one or more limit slots are arranged on the cover plate body and are all located in the protective space, each of the limit slots has an insertion hole, and a flat plug is capable of being inserted into the limit slots through the insertion holes and limited by the limit slots; and electrical wire holes are arranged on the convex edges, opposite to the insertion holes, in the cover plate body.

Preferably, each of the limit slots includes two limit blocks oppositely arranged at an interval;

each of the limit blocks includes a connecting plate and a limit plate;

the connecting plate is vertically arranged relative to the cover plate body, and a bottom surface of the connecting plate is fixedly connected to the cover plate body; and the limit plate is arranged parallel to the cover plate body, and a lower surface of the limit plate is fixedly connected to a top surface of the connecting plate.

Further preferably, the connecting plate and the limit plate are of an integrated structure.

Further preferably, the limit blocks are linear, a corresponding one of the limit slots has two insertion holes, and the electrical wire holes are arranged on the convex edges opposite to the two insertion holes.

Further preferably, the limit blocks are L-shaped, and a corresponding one of the limit slots has only one insertion hole.

On the other hand, the present invention further provides a flat plug, which is used in cooperation with any one of the above protective cover plates, and includes an insulator housing, a plurality of insert pieces, and electrical wires, where a mounting space is arranged in the insulator housing;

each of the insert pieces has one end mounted in the mounting space of the insulator housing and the other end located outside the insulator housing;

each of the electrical wires has one end located in the mounting space of the insulator housing and electrically connected to each of the insert pieces, and the other end located outside the insulator housing; and convex bars extending outwards horizontally are arranged on a periphery of the insulator housing, and positioning inserts matched with limit slots in a protective cover plate are formed on the periphery of the insulator housing.

Preferably, the convex bars have a height matched with a height of connecting plates in the protective cover plate, and a width greater than or equal to a width of limit plates in the protective cover plate.

Further preferably, the flat plug has two electrical wires led out from two opposite side walls of the insulator housing, respectively.

According to the protective cover plate for a flat plug provided by the present invention, the limit slots are arranged on the cover plate body and are configured to be sheathed outside the flat plug and to limit the flat plug, so that the flat plug is located in the protective space of the cover plate body; and the flat plug can be inserted into or pulled from a plugboard by operating the protective cover plate, so that a hand is kept away from a wall switch, the risk of electric shock is reduced, and the safety is improved.

The flat plug provided by the present invention is used in cooperation with the above protective cover plate, and the positioning inserts matched with the limit slots are arranged on the flat plug, thereby improving the safety of use.

Both the protective cover plate for a flat plug and the flat plug with the same provided by the present invention have the advantages of simple structure, reasonable design, convenient use, high safety and the like.

BRIEF DESCRIPTION OF THE DRAWINGS

The drawings constituting a part of the present application are used to provide a further understanding of the present invention. Schematic embodiments of the present invention and their descriptions are used to explain the present invention and do not constitute improper limitations to the present invention. In the drawings.

DETAILED DESCRIPTION OF THE EMBODIMENTS

Figure 1:
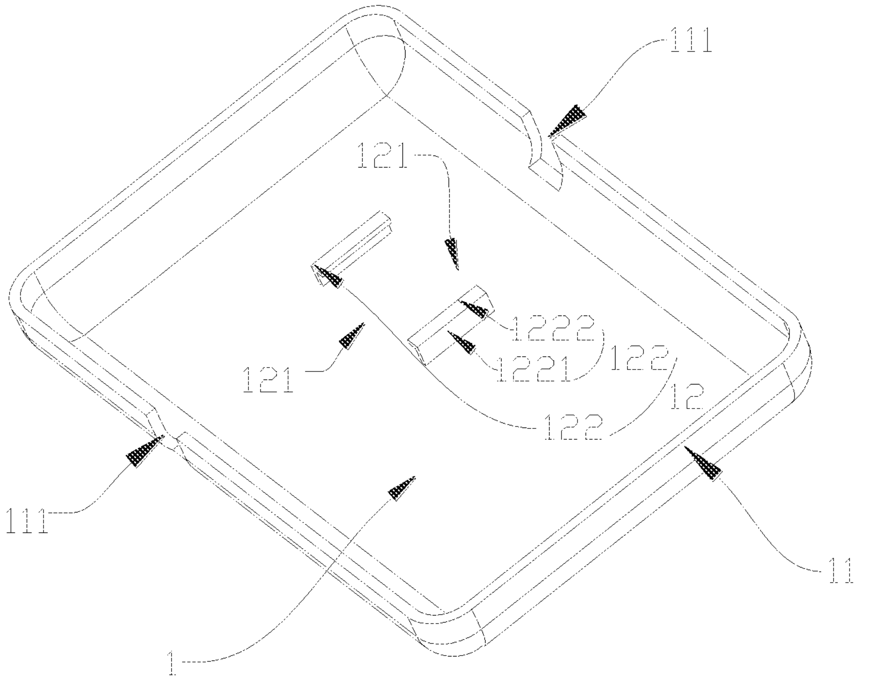
FIG. 1 is a schematic structural diagram of a first protective cover plate for a flat plug provided in an embodiment disclosed by the present invention.

The present invention will be described in detail below with reference to the drawings and in combination with the embodiments. Various examples are provided by way of explanation of the present invention rather than limiting the present invention. In fact, it will be apparent to those skilled in the art that modifications and variations may be made in the present invention without departing from the scope or spirit of the present invention. For example, the features illustrated or described as part of one embodiment may be used for another embodiment to produce one more embodiment. Therefore, it is expected that the present invention includes such modifications and variations within the scope of appended claims and their equivalents.

In the description of the present invention, the orientations or positional relationships indicated by the terms "longitudinal", "transverse", "upper", "lower", "front", "rear", "left", "right", "vertical", "horizontal", "top" and "bottom" are shown in the drawings, are only for the convenience of describing the present invention rather than requiring the present invention to be constructed and operated in a specific orientation, and therefore may not be understood as the limitations to the present invention. The terms "connected", "connection" and "arranged" used in the present invention should be understood in a broad sense. For example, the "connection" may be a fixed connection or a detachable connection; the "connected" may be directly connected or indirectly connected through an intermediate component; and the "connection" may be a wired electrical connection, a radio connection, or a wireless communication signal connection. For those of ordinary skill in the art, the specific meanings of the above terms may be understood according to the specific circumstances.

One or more examples of the present invention are shown in the drawings. The numerical and letter symbols are used in the detailed description to refer to the features in the drawings. The similar or analogous symbols in the drawings and description have been used to refer to the similar or analogous parts of the present invention. As used herein, the terms "first", "second" and "third" are used interchangeably to distinguish one component from another, and are not intended to denote the position or importance of the individual component.

Figure 4:
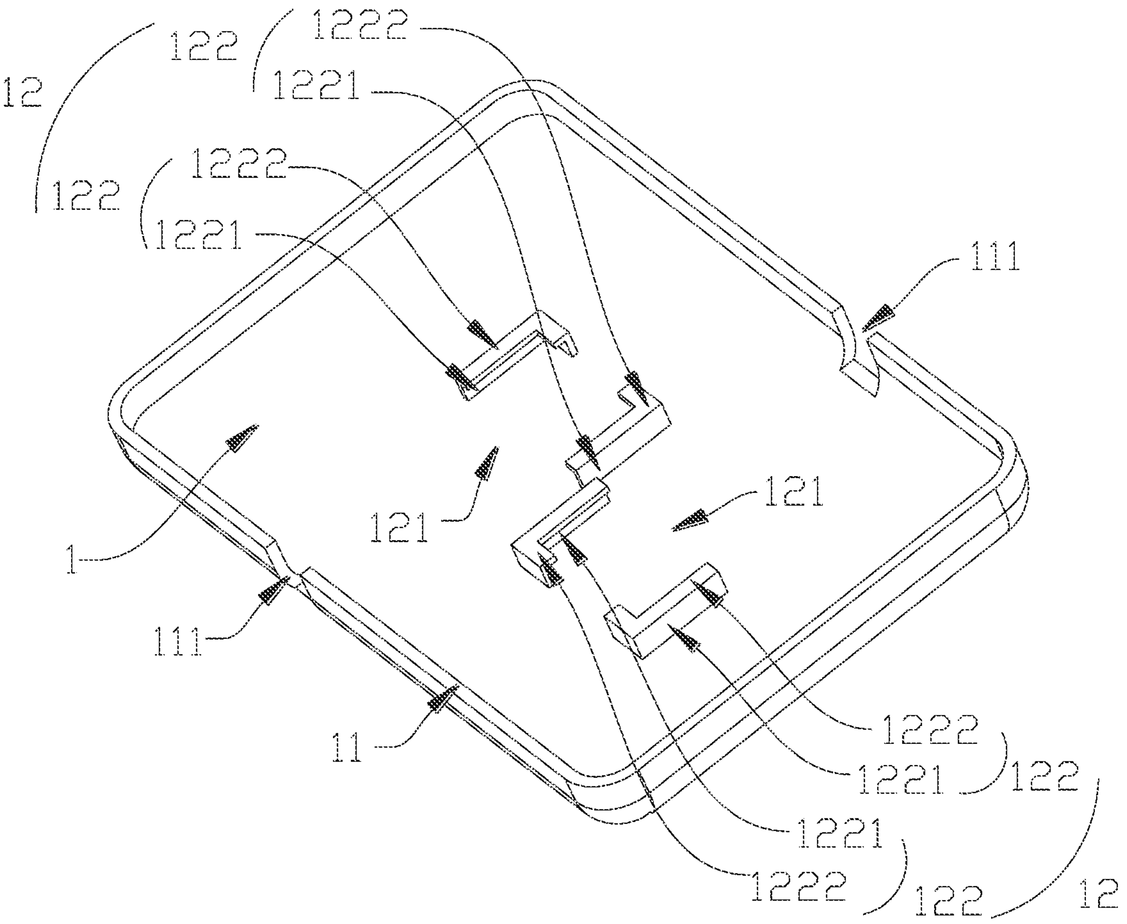
FIG. 4 is a schematic structural diagram of a second protective cover plate for a flat plug provided in an embodiment disclosed by the present invention.
Figure 7:
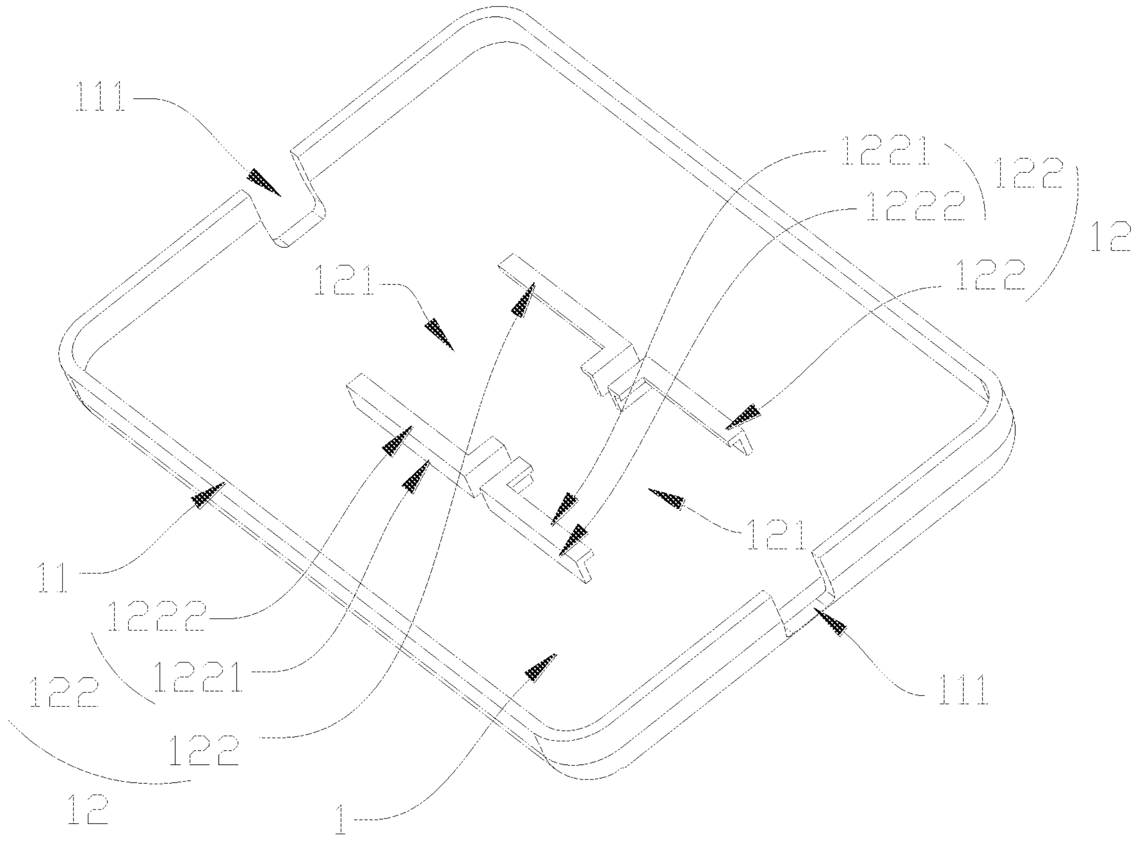
FIG. 7 is a schematic structural diagram of a third protective cover plate for a flat plug in an embodiment disclosed by the present invention.

To solve the problem of potential safety hazards caused by a hand being close to a wall socket during insertion and pulling of a conventional flat plug, this implementation solution provides a protective cover plate for a flat plug. Referring to FIG. 1, FIG. 4, and FIG. 7, the protective cover plate includes a cover plate body 1, where convex edges 11 extending upwards are arranged around the cover plate body 1 and are integrated with the cover plate body 1 in design, and joints between the convex edges and the cover plate body are designed to be circular chamfers; through the arrangement of the above convex edges 11, a protective space is formed on a surface of the cover plate body 1; one or more limit slots 12 are arranged in the protective space, each limit slot 12 has an insertion hole 121, and the flat plug can be inserted into the limit slots 12 through the insertion holes 121 and limited by the limit slots 12; and electrical wire holes 111 are arranged on the convex edges 11, opposite to the insertion holes 121, in the cover plate body 1 and are used for electrical wires in the flat plug to pass through.

Each limit slot 12 includes two limit blocks 122 oppositely arranged at an interval; and each limit block 122 includes a connecting plate 1221 and a limit plate 1222, the connecting plate 1221 is vertically arranged relative to the cover plate body 1, a bottom surface of the connecting plate 1221 is fixedly connected to the cover plate body 1, the limit plate 1222 is arranged parallel to the cover plate body 1, a lower surface of the limit plate 1222 is fixedly connected to a top surface of the connecting plate 1221, and eventually an end surface of the limit block 122 is L-shaped. During use, the flat plug is limited jointly by the connecting plates 1221 and the limit plates 1222 under the guide of the connecting plates 1221. In general, the connecting plate 1221 and the limit plate 1222 are of an integrated structure.

Figure 2:
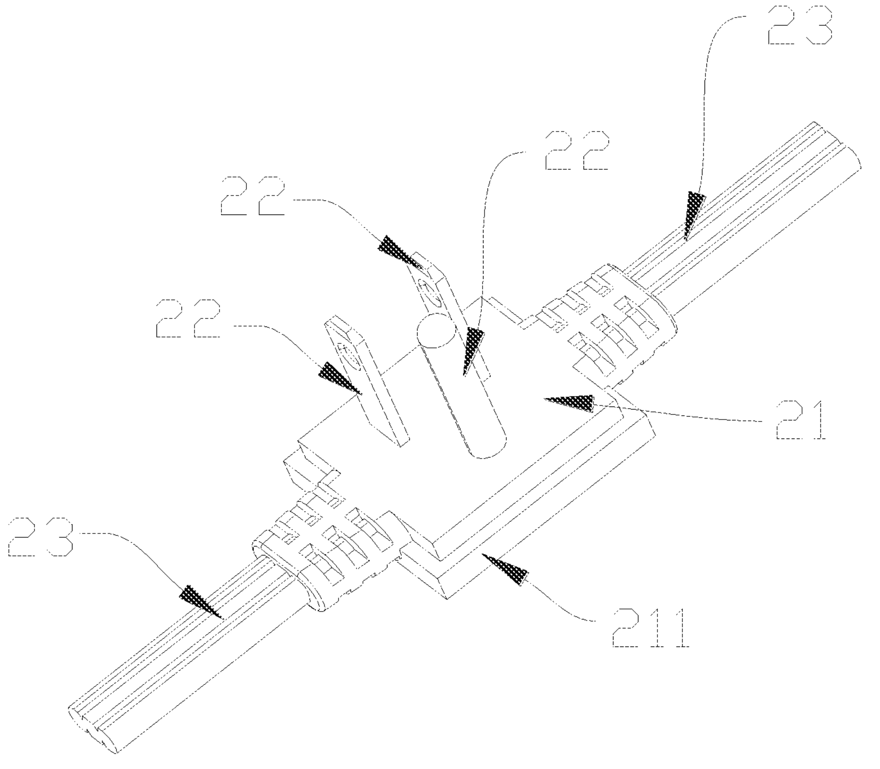
FIG. 2 is a schematic structural diagram of a flat plug provided in an embodiment disclosed by the present invention.
Figure 5:
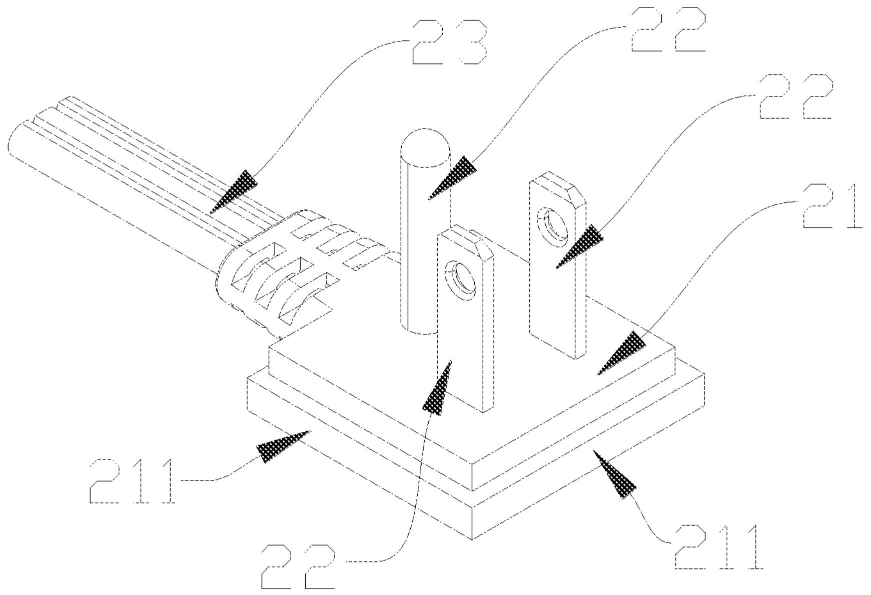
FIG. 5 is a schematic structural diagram of another flat plug provided in an embodiment disclosed by the present invention.

Referring to FIG. 2 and FIG. 5, this implementation solution provides a flat plug used in cooperation with the above protective cover plate, which has the same structure as an existing flat plug. The flat plug mainly includes an insulator housing 21, a plurality of insert pieces 22, and electrical wires 23, where a mounting space is arranged in the insulator housing 21; each insert piece 22 has one end mounted in the mounting space of the insulator housing 21 and the other end located outside the insulator housing 21; there are two or three inset pieces 22; when there are two insert pieces, the two insert pieces are a neutral wire insert piece and a live wire insert piece, respectively; when there are three insert pieces, the three insert pieces are a neutral wire insert piece, a live wire insert piece, and a ground wire insert piece, respectively; and each above electrical wire 23 has one end located in the mounting space of the insulator housing 21 and electrically connected to each insert piece 22, and the other end located outside the insulator housing 21 and configured to be connected to an electrical appliance. For use in cooperation with the above protective cover plate, referring to FIG. 2 and FIG. 5, convex bars 211 extending outwards horizontally are arranged on a periphery of the insulator housing 21, and positioning inserts matched with limit slots 12 in the protective cover plate are formed on the periphery of the insulator housing 21, where a height of the convex bars 211 is matched with a height of connecting plates 1221 in the protective cover plate, and a distance between outer edges of the convex bars 211 on two sides is matched with a distance between two connecting plates 1221 in the limit slot 12, so that the positioning inserts in the insulator housing 21 can be exactly inserted along the two connecting plates 1221 in the limit slot 12 from insertion holes 121, and upper panels of positioning insertion bars abut against limit plates 1222 for limiting; and preferably, a width of the convex bars 211 is greater than or equal to a width of the limit plates 1222 in the protective cover plate.

The number of limit slots 12 in the protective cover plate provided by the above implementation solution may be set according to actual requirements, and the specific shape of the limit blocks 122 in the limit slot 12 is specifically designed based on the structure of the corresponding flat plug. In general, the shape of the limit blocks 122 mainly includes two types of a linear shape and an L shape.

Several specific protective cover plates and flat plugs used in cooperation are respectively listed below to further explain the technical solution.

Embodiment 1

Referring to FIG. 1 which is a first protective cover plate A for a flat plug, a limit slot 12 is arranged in a protective space formed between a cover plate body 1 and convex edges 11 around the cover plate body 1, and includes two limit blocks 122 oppositely arranged at an interval; the two limit blocks 122 are linear and are arranged in parallel; each limit block 122 includes a connecting plate 1221 and a limit plate 1222, where the connecting plate 1221 is vertically arranged relative to the cover plate body 1, a bottom surface of the connecting plate 1221 is fixedly connected to the cover plate body 1, the limit plate 1222 is arranged parallel to the cover plate body 1, a lower surface of the limit plate 1222 is fixedly connected to a top surface of the connecting plate 1221, and eventually an end surface of the limit block 122 is L-shaped; an insertion hole 121 is provided on each of two ends of the limit slot 12; and electrical wire holes 111 are arranged on the convex edges 11, opposite to the above two insertion holes 121, in the cover plate body 1.

Referring to FIG. 2 which is a flat plug used in cooperation with the above protective cover plate, the flat plug includes an insulator housing 21, three insert pieces 22, and two electrical wires 23, where a mounting space is arranged in the insulator housing 21; each insert piece 22 has one end mounted in the mounting space of the insulator housing 21 and the other end located outside the insulator housing 21; the two electrical wires 23 are led out from two opposite side walls of the insulator housing 21, respectively; and each electrical wire 23 has one end located in the mounting space of the insulator housing 21 and electrically connected to each insert piece 22, and the other end located outside the insulator housing 21 and configured to be connected to an electrical appliance. For use in cooperation with the above protective cover plate, convex bars 211 extending outwards horizontally are arranged on a periphery of the insulator housing 21, and a positioning insert matched with a limit slot 12 in the protective cover plate is formed on the periphery of the insulator housing 21, where a height of the convex bars 211 is matched with a height of connecting plates 1221 in the protective cover plate, and a distance between outer edges of the convex bars 211 on two sides is matched with a distance between two connecting plates 1221 in the limit slot 12.

Figure 3:
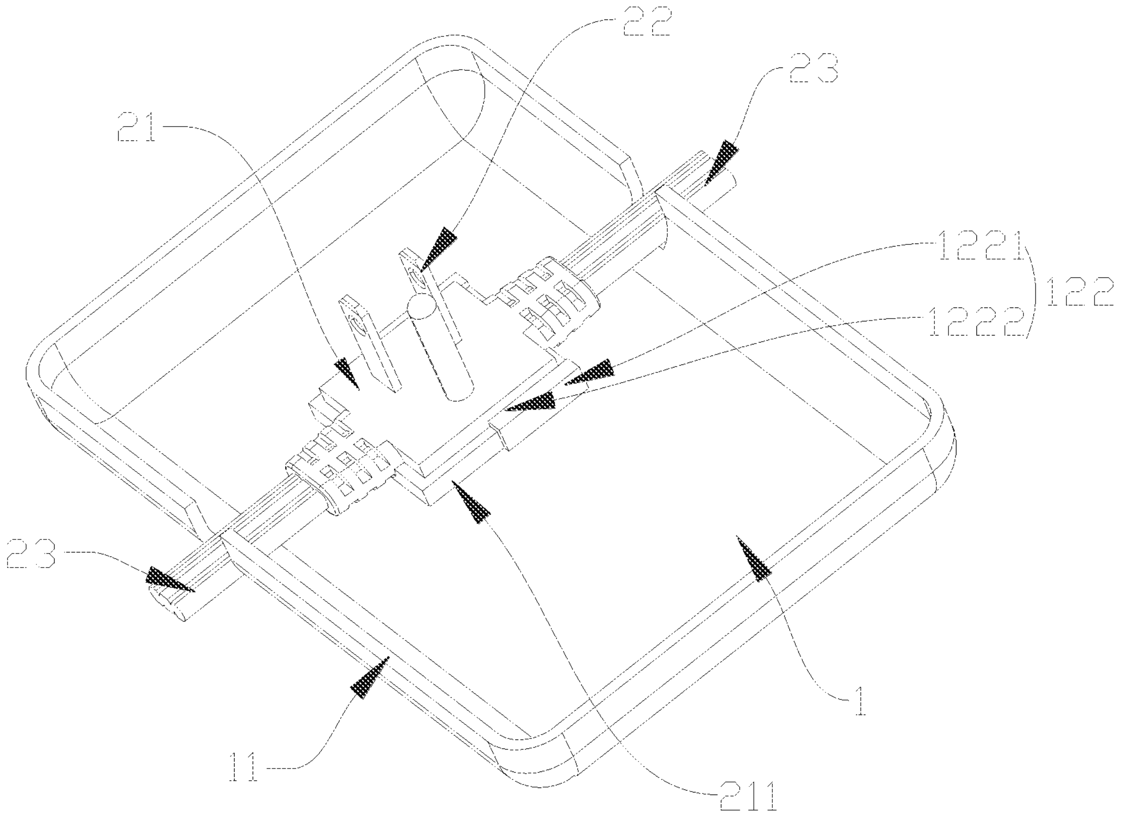
FIG. 3 is a schematic diagram of cooperative use of a first protective cover plate for a flat plug and the flat plug provided in an embodiment disclosed by the present invention.

During use, referring to FIG. 3, the flat plug is nested in the limit slot 12 of the protective cover plate. Specifically, the convex bars 211 on two sides in the insulator housing 21 can be exactly inserted along the two connecting plates 1221 in the limit slot 12 from insertion holes 121, and upper panels of positioning insertion bars abut against limit plates 1222 for limiting; and the two electrical wires 23 of the flat plug pass through electrical wire holes 111 on adjacent convex edges 11.

Embodiment 2

Referring to FIG. 4 which is a second protective cover plate for a flat plug, two limit slots 12 is arranged in a protective space formed between a cover plate body 1 and convex edges 11 around the cover plate body 1, and includes two limit blocks 122 oppositely arranged at an interval; the two limit blocks 122 are linear and are arranged in parallel; each limit block 122 includes a connecting plate 1221 and a limit plate 1222, where the connecting plate 1221 is vertically arranged relative to the cover plate body 1, a bottom surface of the connecting plate 1221 is fixedly connected to the cover plate body 1, the limit plate 1222 is arranged parallel to the cover plate body 1, a lower surface of the limit plate 1222 is fixedly connected to a top surface of the connecting plate 1221, and eventually an end surface of the limit block 122 is also L-shaped; an insertion hole 121 is provided on one end of the limit slot 12; and electrical wire holes 111 are arranged on the convex edges 11, opposite to the above insertion holes 121, in the cover plate body 1.

Referring to FIG. 5 which is a flat plug used in cooperation with the above protective cover plate, the flat plug includes an insulator housing 21, three insert pieces 22, and an electrical wire 23, where a mounting space is arranged in the insulator housing 21; each insert piece 22 has one end mounted in the mounting space of the insulator housing 21 and the other end located outside the insulator housing 21; and the electrical wire 23 has one end located in the mounting space of the insulator housing 21 and electrically connected to each insert piece 22, and the other end located outside the insulator housing 21 and configured to be connected to an electrical appliance. For use in cooperation with the above protective cover plate, convex bars 211 extending outwards horizontally are arranged on a periphery of the insulator housing 21, and positioning inserts matched with limit slots 12 in the protective cover plate are formed on the periphery of the insulator housing 21, where a height of the convex bars 211 is matched with a height of connecting plates 1221 in the protective cover plate, and a distance between outer edges of the convex bars 211 on two sides is matched with a distance between two connecting plates 1221 in the limit slot 12.

Figure 6:
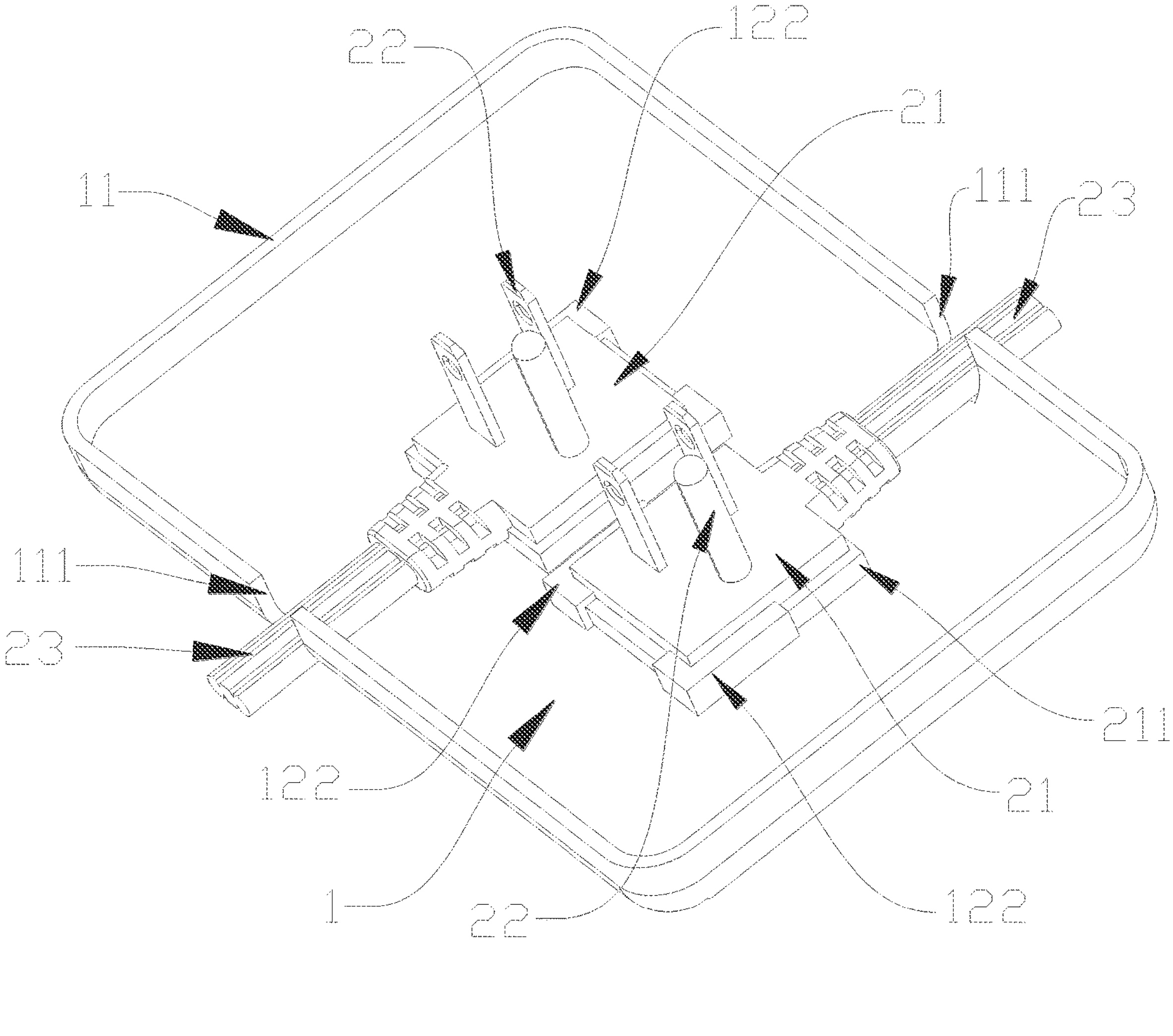
FIG. 6 is a schematic diagram of cooperative use of a second protective cover plate for a flat plug and the flat plug provided in an embodiment disclosed by the present invention.

During use, referring to FIG. 6, the flat plug is nested in the limit slots 12 of the protective cover plate. Specifically, the positioning inserts in the insulator housing 21 can be exactly inserted along the two connecting plates 1221 in the limit slot 12 from insertion holes 121, and upper panels of positioning insertion bars abut against limit plates 1222 for limiting; and the electrical wire 23 of the flat plug passes through the electrical wire holes 111 on the convex edges 11 on upper and lower sides. Since the two limit slots 12 are arranged on the protective cover plate, two flat plugs may be mounted on the protective cover plate, as shown in FIG. 6.

Embodiment 3

Referring to FIG. 7 which is a third protective cover plate for a flat plug, two limit slots 12 are oppositely arranged in a protective space formed between a cover plate body 1 and convex edges 11 around the cover plate body 1; insertion holes 121 in the two limit slots 12 have different directions; each limit slot 12 includes two limit blocks 122 oppositely arranged at an interval; each limit block 122 is L-shaped and includes a connecting plate 1221 and a limit plate 1222, where the connecting plate 1221 is vertically arranged relative to the cover plate body 1, a bottom surface of the connecting plate 1221 is fixedly connected to the cover plate body 1, the limit plate 1222 is arranged parallel to the cover plate body 1, a lower surface of the limit plate 1222 is fixedly connected to a top surface of the connecting plate 1221, and eventually an end surface of the limit block 122 is also L-shaped; the insertion hole 121 is provided on one end of the limit slot 12; and electrical wire holes 111 are arranged on the convex edges 11, opposite to the above insertion holes 121, in the cover plate body 1.

A structure of a flat plug used in cooperation with the above protective cover plate is also as shown in FIG. 5, is the same as that in Embodiment 2, and will not be repeated herein.

Figure 8:
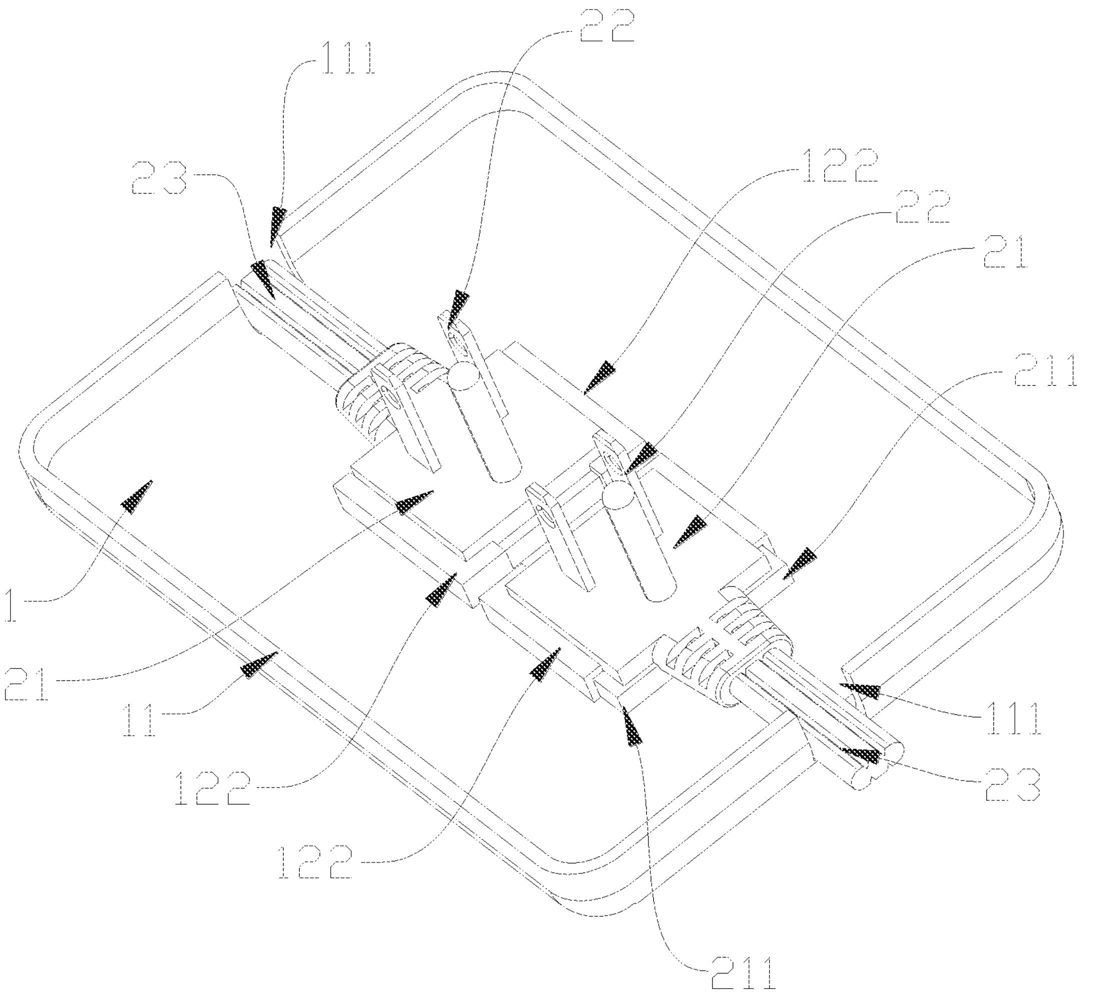
FIG. 8 is a schematic diagram of cooperative use of a third protective cover plate for a flat plug and the flat plug provided in an embodiment disclosed by the present invention.

During use, referring to FIG. 8, the flat plug is nested in the limit slots 12 of the protective cover plate. Specifically, the positioning inserts in the insulator housing 21 can be exactly inserted along the two connecting plates 1221 in the limit slot 12 from the insertion holes 121, and upper panels of positioning insertion bars abut against the limit plates 1222 for limiting; and the electrical wire 23 of the flat plug passes through the electrical wire holes 111 on the convex edges 11 on left and right sides. Since the two limit slots 12 are arranged on the protective cover plate, two flat plugs may be mounted on the protective cover plate, as shown in FIG. 8.

The above three embodiments only provide three specific cases. During actual use, the number, positions and directions of limit slots on the protective cover plate may be set according to actual requirements.

The protective cover plate provided in the above implementation solution is sheathed on the flat plug to add insulation protection of 1-2 mm to the flat plug, so as to improve the safety. Meanwhile, the electrical wires in the flat plug can also pass through the electrical wire holes of the protective cover plate; when the flat plug is inserted into the wall socket, the convex edges on the protective cover plate are connected to the surface of a wall, and the electrical wires passing through the electrical wire holes are attached to the wall and come out; the electrical wires may respectively extend out from four directions of the protective cover plate according to different positions of the electrical wire holes, so that a household appliance such as a television above the socket is convenient to connect; the electrical wires may extend out from a lower side of the wall socket, so that a household appliance below the socket is convenient to connect; the electrical wires may extend out from a left side of the wall socket, so that a household appliance or a lamp on the left side of the socket is convenient to connect; and the electrical wires may extend out from a right side of the wall socket, so that a household appliance or a lamp on the right side of the socket is convenient to connect. Therefore, the convenience is brought in use.

The above descriptions are only the preferred embodiments of the present invention, and are not used to limit the present invention. For those skilled in the art, the present invention may have various modifications and variations. Any modifications, equivalent substitutions, improvements, etc. made within the spirit and principle of the present invention should be included within the scope of protection of the present invention.

What is claimed is:

1. A protective cover plate for a flat plug, comprising a cover plate body, wherein convex edges extending upwards are arranged around the cover plate body, so that a protective space is formed on a surface of the cover plate body;

one or more limit slots are arranged on the cover plate body and are all located in the protective space, each of the limit slots has an insertion hole, and the flat plug is capable of being inserted into the limit slots through the insertion holes and limited by the limit slots; and electrical wire holes are arranged on the convex edges, opposite to the insertion holes, in the cover plate body.

2. The protective cover plate for a flat plug according to claim 1, wherein each of the limit slots comprises two limit blocks oppositely arranged at an interval;

each of the limit blocks comprises a connecting plate and a limit plate;

the connecting plate is vertically arranged relative to the cover plate body, and a bottom surface of the connecting plate is fixedly connected to the cover plate body;

the limit plate is arranged parallel to the cover plate body, and a lower surface of the limit plate is fixedly connected to a top surface of the connecting plate.

3. The protective cover plate for a flat plug according to claim 2, wherein the connecting plate and the limit plate are of an integrated structure.

4. The protective cover plate for a flat plug according to claim 2, wherein the limit blocks are linear, a corresponding one of the limit slots has two insertion holes, and the electrical wire holes are arranged on the convex edges opposite to the two insertion holes.

5. The protective cover plate for a flat plug according to claim 2, wherein the limit blocks are L-shaped, and a corresponding one of the limit slots has only one insertion hole.

6. A flat plug, comprising an insulator housing, a plurality of insert pieces, and electrical wires, wherein a mounting space is arranged in the insulator housing; each of the insert pieces has one end mounted in the mounting space of the insulator housing and the other end located outside the insulator housing;

each of the electrical wires has one end located in the mounting space of the insulator housing and electrically connected to a respective one of the insert pieces, and the other end located outside the insulator housing; and convex bars extending outwards horizontally are arranged on a periphery of the insulator housing, and positioning inserts matched with limit slots in a protective cover plate are formed on the periphery of the insulator housing;

the flat plug has two electrical wires led out from two opposite side walls of the insulator housing, respectively.

7. The flat plug according to claim 6, wherein the convex bars have a height matched with a height of connecting plates in the protective cover plate, and a width greater than or equal to a width of limit plates in the protective cover plate.

* * * * *